United States Patent [19]

Levine

[11] Patent Number: 4,886,297
[45] Date of Patent: Dec. 12, 1989

[54] SKATEBOARD HANDLE

[76] Inventor: Norman Levine, 2205 NW 30th Pl., Pompano Beach, Fla. 33060

[21] Appl. No.: 238,622

[22] Filed: Aug. 30, 1962

[51] Int. Cl.[4] .............................................. A63C 17/14
[52] U.S. Cl. .................................. 280/809; 16/114 R; 24/702; 280/87.042; 403/331; 403/381
[58] Field of Search ........................... 24/573, 589, 702; 403/319, 331, 381; 114/364; 441/73, 76; 280/12 H, 606, 809, 87.04 R, 87.04 A; 16/114 R

[56] References Cited

U.S. PATENT DOCUMENTS

| 1,150,773 | 8/1915 | Chall | 280/87.04 A |
|---|---|---|---|
| 1,702,695 | 2/1929 | Hoult | 280/809 X |
| 1,931,386 | 10/1933 | Hughes | 403/319 X |
| 3,195,680 | 7/1965 | Thornburg et al. | 114/364 X |
| 3,269,742 | 8/1966 | Funyak et al. | 280/606 |
| 3,625,554 | 12/1971 | Mottais et al. | 403/319 X |
| 4,061,351 | 12/1977 | Bangle | 280/87.04 A |
| 4,179,134 | 12/1979 | Atkinson | 280/87.04 A |
| 4,591,343 | 5/1986 | Schaumann | 441/76 |
| 4,707,884 | 11/1987 | Chang | 280/87.04 R X |

Primary Examiner—Charles A. Marmor
Assistant Examiner—Michael Mar
Attorney, Agent, or Firm—Malin, Haley & McHale

[57] ABSTRACT

A handle for removable attachment to a skateboard comprises a handle stem, a handle bar fastened to one end of the stem, and connecting structure secured at the other end of the stem for removably connecting the stem to the front end of a skateboard in upstanding relation thereto, the connecting structure having a base plate with a pair of opposed downwardly facing L-shaped grooves for sliding engagement with the slides of a generally horizontal flat plate member rigidly connected to the lower end of the stem. A fastening clip is connectable to said base plate for holding the stem in connection therewith. Alternative connecting structure may be employed by way of a removable hinge pin and related structure. Bracing strut member may be employed in connection with the handle stem for resisting twisting moments applied by a rider. The connecting structure is provided with a bolt hole pattern adapted to connect to the universal skateboard wheel truck bolt pattern.

2 Claims, 2 Drawing Sheets

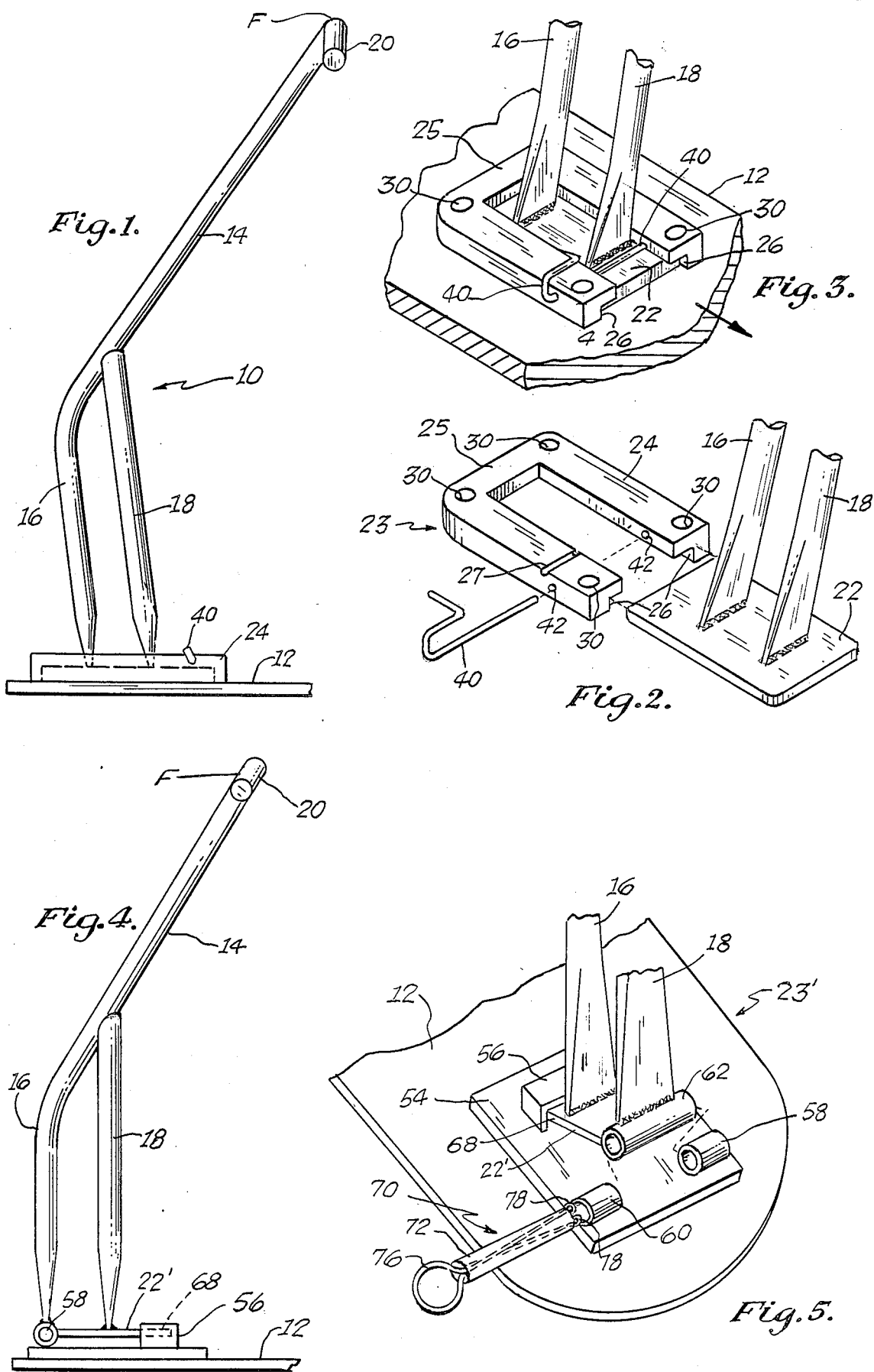

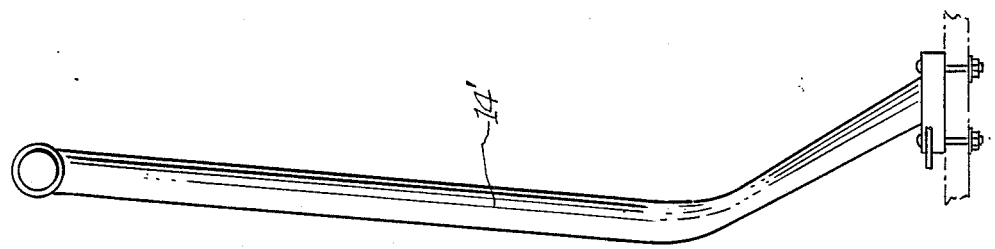
Fig. 9b.
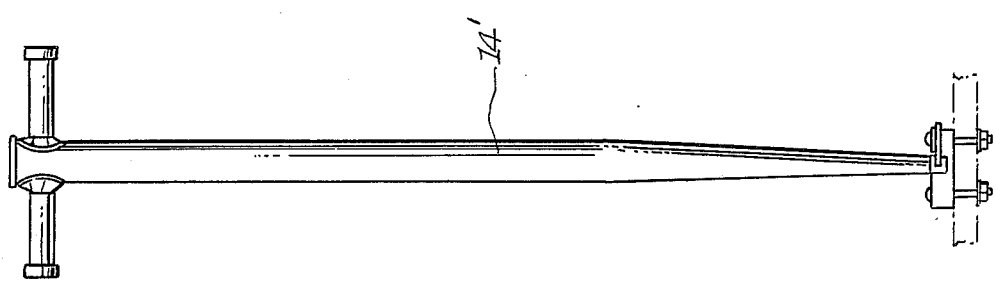
Fig. 9a.
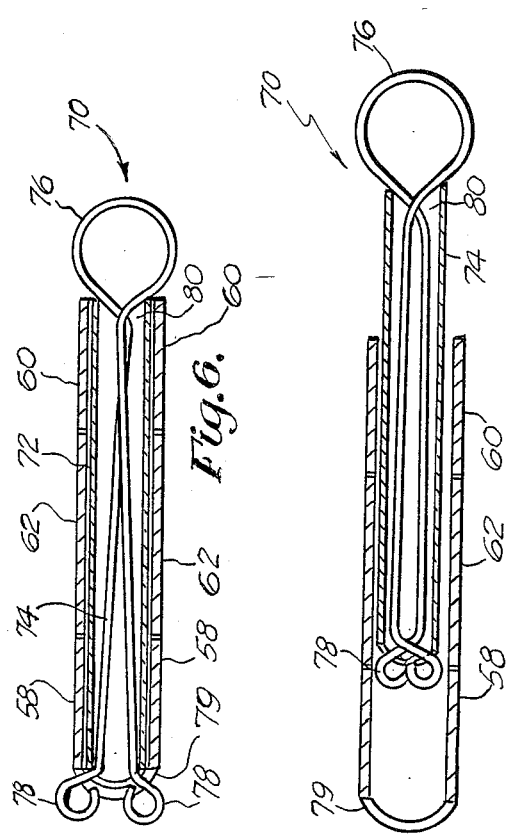
Fig. 6.
Fig. 8.
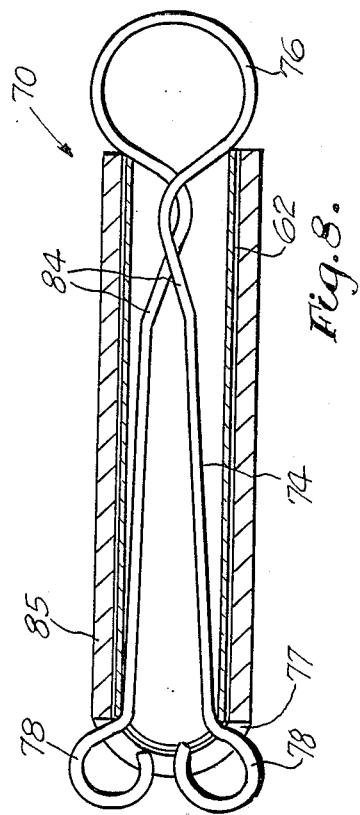
Fig. 7.

SKATEBOARD HANDLE

BACKGROUND OF THE INVENTION

1. Field of the Invention

The invention relates to skateboards and in particular to a skateboard handle bar and stem removably connectable to a standard skateboard using novel and unique connecting means and which is quickly connectable and disconnectable thereto.

2. Description of the Prior Art

In view of the inherent risk involved in the riding of handle-less skateboards, it is desirable to provide the rider with a structure to grasp while riding. This need is particularly acute for beginners who have not yet developed the sense of balance required for riding the typical skateboard.

Past efforts directed at providing handlebar structure are found in U.S. Pat. No. 4,179,134 to Atkinson and U.S. Pat. No. 4,093,252 to Rue and U.S. Pat. No. 2,330,147 to Rodriguez. Also of interest is U.S. Pat. No. 4,064,351 to Bangle for its removable skateboard handle post.

The instant invention provides an improvement over the prior art in its disclosure of a novel skateboard handle adapted to be rigidly yet removably connected to a conventional skateboard. The new configuration disclosed herein provides greater statical determinacy then heretobefore shown. A high-strength handle/skateboard interconnection is of the utmost importance due to the extremely high twisting moments created by the rider applying force to the handlebar while riding. Said twisting moments are absorbed almost entirely by the handle/skateboard connection joint. Should a failure occur at said connection joint, the rider's safety would be put greatly at risk.

SUMMARY OF THE INVENTION

A handle for removable attachment to a skateboard comprises a generally upright stem portion, a handlebar fastened to the upper end of said stem portion, means for removably connecting said stem to a skateboard, and bracing means associated with said stem portion to resist twisting moments. In one embodiment, the means for connecting is comprised of a plate having parallel opposed L-shaped grooves, said plate being connectable to the standard bolt pattern of a skateboard wheel truck, said handlebar stem having connected at its lower end a generally horizontally disposed plate adaptable for sliding engagement with said opposed grooves to thereby connect said handlebar stem to said skateboard. A fastening pin is used to connect said handlebar stem to said plate.

In an alternative embodiment, removable connection of said handlebar stem to the skateboard is achieved by the connection of a pair of female hinge members welded in spaced coaxial relation with respect to each other and an inverted U-shaped bracket connected to the skateboard an equal distance from each of said female hinge pin members. Connecting means is associated with the lower end of said stem having a female hinge pin member connectable between said outer female hinge pin members in coaxial relation thereto and the connecting means further having a rearwardly extending member for connection to said inverted U-shaped bracket. An elongated cylindrical quick-release retaining pin means may be inserted through said female hinge pin members in telescoping relation for removably connecting said skateboard handle to a skateboard.

Said cylindrical quick-release retaining pin means is comprised of a hollow cylindrical sleeve having disposed therethrough along the elongate axis a pair of resilient strands overlapping each other one turn, preferably formed of a single strand of wire looped into a U-shape having a first end formed into a ring, said ring having a greater diameter than the inner diameter of said sleeve, the second end thereof comprising holding means for preventing said strands and sleeve from being removed from within the female hinge member(s) until the ring is grasped and then simultaneously twisted and pulled thereby overcoming the frictional engagement of the holding means with the female hinge members. The retaining pin is installed by manually squeezing together the holding means portion of said pin and inserting said pin through the female hinge pin members connected to said base plate and to said handle stem, respectively. Once said retaining pin means is in place, it cannot be removed except by grasping the looped end thereof and exerting both a twisting and a pulling force thereon which causes the holding means to be squeezed inwardly thereby being able to fit through the inner diameter of said hinge pin female members for removal.

It is the primary object of the instant invention to provide a new and unique skateboard handle means for increasing the safety to a skateboard rider.

It is also an object of the present invention to provide a skateboard safety handle means which is easily adaptable to a standard skateboard.

It is a further object of the present invention to provide a skateboard safety handle means which is quickly removable from connection to a skateboard so that the bulk of the skateboard/safety handlebar means is broken down to thereby allow the elements to be stored in such places as a school locker.

A still further object of the present invention is to provide a quick release skateboard safety handle means.

BRIEF DESCRIPTION OF THE DRAWINGS

FIG. 1 shows a side elevational view of a skateboard safety handle connected to a conventional skateboard upper surface.

FIG. 2 shows in exploded relation one embodiment of the present invention including lower horizontal stem brace plate, associated base plate and fastening pin.

FIG. 3 shows the embodiment of FIG. 2 assembled.

FIG. 4 shows a second embodiment of the invention showing a side elevational view of a second embodiment of the invention.

FIG. 5 shows a partially exploded view of the embodiment of FIG. 4.

FIG. 6 shows cutaway of the retaining pin means of FIG. 5.

FIG. 7 shows cutaway of the view of FIG. 6 wherein the sleeve and holding means are partially withdrawn.

FIG. 8 shows an alternative configuration of the strand of the retaining pin means.

FIG. 9a is a front view of another embodiment of the handle with a single tubular configuration.

FIG. 9b is a side view of FIG. of 9a.

DETAILED DESCRIPTION OF THE PREFERRED EMBODIMENT

Referring to the drawings, FIGS. 1, 2 and 3 show an embodiment of the instant invention comprised of a generally upright skateboard handle 14 attached to the upper surface of a conventional skateboard 12 by connecting means 23. Connecting means may be comprised generally of member 25, plate 22 and fastening pin 40. Handle 14 is comprised preferably, but not by way of limitation, of a single stem portion at its upper one half having a bifurcated lower end comprised of furcations 16 and 18 connected to a lower generally horizontal base plate 22. Base plate 22 is adapted to slidingly engage a pair of opposed parallel downwardly facing grooves 26 defined by L-shaped side walls disposed in connecting member 24. Connecting member 24 is adapted to be rigidly connected to the skateboard using the universal skateboard wheel truck bolt pattern arrangement shown by openings 30 adapted to receive fastening means such as bolts (not shown). By using connecting member 24 the skateboard 12 need not be modified in any way in order to employ the instant invention except that the bolts must be removed, member 24 placed in position, and the bolts replaced through holes 30 and into the wheel truck.

Fastening pin 40 is used to hold handle 14 and base plate 22 in place and is positionable through aligned apertures 42 disposed in either side wall of member 24 and in groove 27 extending across the top of one of said side walls of member 24, as best seen in FIG. 2. The assembled configuration shown in FIG. 3 reveals that fastening pin 40, when connected through aligned apertures 42 to member 24, is disposed forwardly of furcation 18 so that fastening pin 40 retains handle 14 in place against any tendency for forward movement in grooves 26 of member 24. Rear wall portion 25 retains handle 14 in place against rearward movement thereof. The horizontal side walls of grooves 26 retain handle 14 in place against side to side movement, thus completing the removable rigid interconnection of handle 14 with skateboard 12. The arrow in FIG. 3 points to the front end of skateboard 12.

FIGS. 4 and 5 show a second embodiment of the instant invention whereby skateboard handle 14 is connectable to a standard skateboard using connecting means 23' which is comprised of a base plate 54, is rigidly connectable to a standard skateboard truck bolt pattern as in the first embodiment set forth above, inverted U-shape bracket 56, a pair of aligned equally spaced apart female sleeve members 58 and 60 generally equally spaced apart from bracket 56, said sleeve members 58 and 60 spaced apart a distance sufficient to accommodate connecting sleeve 62 therebetween in coaxial alignment and horizontal plate 22'. As best seen in FIG. 5, connecting pin or retaining pin means 70 is to be disposed through aligned sleeves 58, 60 and 62 after tongue member 68 of handle lower plate 22' is engaged within inverted U-shaped bracket 56.

It can readily be seen in FIGS. 1, 2 and 4 that the force directed along arrow F causes a compressive load to be borne by furcation or strut 18 which is transferred directly to plate 22 (or 22') which is thereafter transferred to either pin 40 or sleeves 58, 60 and 62 at the front bracket 56 at the rear, in the embodiment shown in FIGS. 4 and 5, and to member 24 and fastening pin 40 in the embodiments shown in FIGS. 1, 2 and 3.

As best seen in FIGS. 5 through 8, retaining means 70, which may be used to replace any sleeve/pin hinge, is comprised of an outer sleeve shown in FIG. 5 as sleeves 58, 60, and 62, and is further comprised of an inner sleeve 72 having a hollow internal recess wherein is disposed a looped resilient wire strand having a first enlarged end 76 comprised of a finger engageable loop portion and a second enlarged end comprised of a pair of outwardly diverging crimped or bent ends 78 to be more fully described below. Strand 74 is a single piece of resilient wire or other resilient material exhibiting spring-like properties shaped into a 180 degree bend, the intermediate portion of the U-shape being first end 76 and the terminus ends of the respective straight portions comprising second ends 78. For purposes of this disclosure, the term "enlarged end" is meant to comprise structure having a greater cross sectional diameter then the inside diameter of sleeve 72 and is contemplated to be shapes other then loops.

End 76 is of an enlarged size so as to be engageable by a finger of an individual to be pulled and rotated to actuate the quick release feature of retaining pin means 70. Ends 78 comprise a second end of enlarged size so that it cannot pass through sleeve 72 unless strand 74 is simultaneously pulled and rotated at least a nominal amount causing ends 78 to be drawn toward each other decreasing the separation width of ends 78 thereby allowing strand 74 to be withdrawn along with sleeve 72 from sleeves 58, 60 and 62. As best seen in FIG. 6, strand 74 is bent at 80 such that the straight portions thereof are caused to overlap in the end closest to enlarged end 76 and thereafter diverge toward ends 78 thereby imparting a spring-like quality to strand 74/sleeve 72 combination wherein when strand 74 is disposed within sleeve 72 and ends 78 are squeezed towards one another, they will generally return to their outward enlarged positions shown in FIGS. 5 and 6 by spring action. Strand 74 may be provided with additional bends at 84, best seen in FIG. 8, to increase the friction force between ends 78 and sleeve end 79. In FIG. 7 it can be seen that sleeve 72 and strand 74 move together such that when same are removed entirely from outer sleeve 70 they remain as one integral unit.

In use, retaining pin means 70 is placed in aligned relation with sleeves 58, 60 and 62 and ends 78 squeezed towards each other and urged into the internal recess of sleeve 60 whereafter the entire sleeve 72/strand 74 combination can be slid through sleeves 58, 60 and 62 until enlarged end 76 abuts sleeve 60 and ends 78 emerge from the opposite end of sleeve 58 and expand apart to form a diameter greater than the inner diameter of sleeve 58. In the above configuration with tongue member 68 disposed within inverted U-shaped bracket 56 and retaining pin means 70 fastening the front end portion of plate 22' and sleeve 62 to base member 54, handle 14 is rigidly affixed to the skateboard. When it is desired to remove handle 14, as for instance where the user arrives at school or home and desires to store the skateboard and handle in a place where the assembled construction will not fit, as for instance, a school locker, but the disassembled elements (i.e.: skateboard separated from handle 14) will fit, one merely grasps enlarged end 76 and rotates the strand back and forth while simultaneously pulling away from sleeve 60 whereby because of the overlapping relation of the straight portions of strand 74 and the shape of terminus ends 78 in relation to sleeve 58, ends 78 are urged inwardly toward each other and thereby are allowed to fit within the inner diameter of sleeves 58, 60 and 62, and strand 74/sleeve 72 are pulled out of said sleeves 58, 60 and 62 thereby releasing sleeve 62 from coaxial alignment with sleeves 58 and 60, whereupon member 68 can be removed from bracket 56 and handle 14 separated from member 54 and thereby skateboard 12.

It is readily apparent, as shown in FIG. 8, that sleeves 58, 60 and 62 can be condensed into one elongated sleeve 85. As such it can be seen that retaining pin means 70 confine application almost universally outside of the skateboard art. For example, retaining pin means 70 can be used to secure doors in hinged relation to a structure whereby said door is quickly removable by way of the quick-release retaining pin means 70.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A skateboard safety handle means for being grasped by a skateboard rider, comprising:
    generally upright handle stem means;
    base means connectable to the standard bolt pattern of a skateboard;
    intermediate member means for releasable connection of said upright handle stem means to said base means;
    removable fastener means for releasably connecting said intermediate member means to said base means;
    wherein said intermediate member means is adaptable for sliding engagement within a pair of opposed grooves disposed in said base means, said intermediate member means being rigidly connected to said handle stem, and further comprising fastening pin means releasably connectable to said base means and to said intermediate member means for holding said intermediate member means in positive association with said base means;
    said base means in U-shaped having a pair of opposed generally L-shaped side wall portions defining said grooves;
    said grooves being equally spaced apart and downwardly and inwardly facing;
    said grooves being adaptable to engage said intermediate member means in sliding engagement;
    said base means also having an intermediate member acting as a rear stop against sliding motion of said intermediate member means;
    said removable fastener means being a quick-release retaining pin means;
    said quick-release retaining pin means is comprised of a single strand of resilient metal or plastic having a U-shaped bend, a first leg portion of said retaining pin means being positionable through aligned apertures disposed in the respective side wall portions of said U-shaped base means, a second leg portion of said retaining pin means being comprised of an L-shaped member, said L-shaped member having an upper segment extending generally parallel to the first leg portion and a lower base segment extending transversely to and away from a plane formed by said first leg portion and said upper segment;
    wherein said upper segment of said retaining pin means is adapted to engage in mating relation with a corresponding groove disposed in the upper surface of one of said side wall portions and with said lower base segment of said L-shaped member engaging an inner surface of said one side wall portion when said first leg portion is positioned within said aligned apertures.

2. The skateboard safety handle of claim 1, wherein:
    said groove is offset from and parallel to a vertical plane extending through the aligned apertures in said side walls.

* * * * *